UNITED STATES PATENT OFFICE.

REINHOLD GRÜTER AND HEINRICH POHL, OF CHARLOTTENBURG, GERMANY, ASSIGNORS TO CHEMISCHE WERKE VORM. DR. HEINRICH BYK, OF CHARLOTTENBURG, GERMANY, A CORPORATION OF GERMANY.

STABLE MIXTURE FOR PRODUCING HYDROGEN PEROXID.

975,129.  Specification of Letters Patent.  Patented Nov. 8, 1910.

No Drawing.  Application filed May 4, 1909.  Serial No. 493,918.

*To all whom it may concern:*

Be it known that we, REINHOLD GRÜTER and HEINRICH POHL, subjects of the German Empire, residing at Charlottenburg, Germany, have invented certain new and useful Stable Mixtures for Producing Hydrogen Peroxids.

As is known, hydrogen peroxid is unstable. For this reason alone and also on account of the technical advantages presented by a solid as compared with a liquid, considerable interest attaches to the provision of solid stable substances capable of liberating hydrogen peroxid only when brought into contact with water. If however it be attempted to attain this result by mixing solid hydrated perborates in pulverulent condition with solid acids, it is found that the solid substances react and partially liquefy, even as soon as they are mixed, or sometime afterward forming a concentrated aqueous solution of hydrogen peroxid permeated with salts. By these "hydrated perborates" perborates are understood with their natural contents of water, *i. e.* with the contents of water of crystallization, which they possess according to the known method of production. Such a hydrated perborate is *e. g.* perborate of sodium, $NaBO_3.4H_2O$. This is the most important perborate and is only gained with 4 molecules of water of crystallization. The perborate of sodium with this contents of water of crystallization is technically produced on a large scale and well known in the market.

Perborate of sodium with less than 4 molecules of water of crystallization has to be produced by removing water from $NaBO_3.4H_2O$.

We have now found that the action of the acid substances upon perborates can be prevented by first depriving the hydrated perborates partially or entirely of their water of crystallization. If 1 molecular proportion of these partially or entirely dehydrated perborates be mixed with 1 molecular proportion, or even more, of a solid organic or inorganic acid or of an acid salt, these substances can be ground intimately together without reacting with each other; a dry powder is obtained which can be kept for a long time without undergoing liquefaction, decomposition, or loss of oxygen. This was not to be foreseen, as ordinary hydrated sodium perborate mixed with such acids undergoes such decomposition in a few seconds. If the solid acid be employed in such quantity as to give 1 molecular equivalent of free acid residue (*e. g.* ½ molecule of free tartaric acid) per 1 molecule of perborate there is obtained, on adding water to the mixture, the corresponding salt of the acid employed and free perboric acid, which latter being an unstable body breaks up into boric acid and hydrogen peroxid, both valuable compounds.

Example: As a durable product with the properties named we may mention *e. g.* the following mixture: Commercial perborate of sodium (with 4 mol. $H_2O$) is dried until only about 1 mol. of the water of crystallization remains. The $NaBO_3.1H_2O$ obtained is ground. 100 parts of weight of same are mixed with 172 parts of weight of dried bitartrate of sodium which is also ground. This mixture dissolves in its own weight of water. Thereby the peroxid of hydrogen is liberated at once and completely which can be proved by completely extracting same from the aqueous solution with ether.

In the claims only such perborates shall be understood by "partially dehydrated" perborates which contain less water of crystallization than the perborates produced in the well known manner.

If substances capable of developing a decomposing action or catalytic action be added, for instance peroxid or dry carbonate of manganese, oxygen is obtained in place of hydrogen peroxid. Further by using acids and perborates such that the resulting salts possess a special or particular property, it is possible to impart to the product resulting on addition of water, a new or additional valuable property. Thus for example by using the partially or completely dehydrated alkali perborate and higher fatty acids, soaps are obtained as by-products which together with boric acid and hydrogen peroxid give a valuable mixture suitable for bleaching and laundry purposes.

While water decomposes the new mixtures rapidly in the sense described, other substances which have no decomposing action in the absence of water may be added for particular purposes, for instance disinfecting agents, perfumes, catalytic agents, soaps, carbonates of sodium or lime, sugar, and so forth. These compounds in combination with disinfecting agents serve as disinfectants for medical, such in combination with perfumes for cosmetic purposes. Catalytic agents, e. g. peroxid or carbonate of manganese, are applied if the development of oxygen is desired for deodorizing.

The addition of soap yields a soap valuable for hygienic purposes and possessing a disinfecting effect. Carbonates, for instance carbonate of lime are added for producing dentrifices. The addition of sugar serves for improving the taste, if the substance must be taken without being dissolved for internal therapeutic application as disinfectant. While perfumes, catalytic agents are added in very small proportions, disinfecting agents, such as soaps, carbonates, sugar are usually added in equal quantities as the main substance itself, or even more is added.

The products described differ essentially from those which are gained after Gane's Patent No. 802,099/1905.
Gane applies perborate or percarbonate without acid substances. Gane's products therefore let the persalt react as such. It is true from this persalt also peroxid of hydrogen is liberated on dissolving it in water, but only to a slight degree, viz. only to such a degree as hydrolysis takes place. This hydrolysis takes place only slowly and is only of effect in the presence of a large volume of water, but by a great dilution the effect is reduced, for it is well known that the effect of peroxid of hydrogen is decreased by an increased dilution. On the other hand with Gane the perborate of sodium is applied in a very diluted concentration, since it is itself only soluble at about 2%. Our products however contain a certain quantity of acid which by the addition of water reacts with the perborate and liberates the peroxid of hydrogen quickly and completely. This reaction takes place perfectly and quickly 4 with little water and yields a peroxid of hydrogen of higher concentration.

What we claim is:

1. The herein described new, solid, stable mixtures of perborates containing a lesser quantity of water of crystallization than completely hydrated perborates and solid acid substances yielding hydrogen peroxid with water.

2. The new, solid, stable mixtures of finely ground perborates containing a lesser quantity of water of crystallization than completely hydrated perborates, and finely ground acid substances, which mixtures yield hydrogen peroxid when mixed with water.

In witness whereof we have hereunto signed our names this 18th day of March 1909, in the presence of two subscribing witnesses.

REINHOLD GRÜTER.
HEINRICH POHL.

Witnesses:
HENRY HASPER,
WOLDEMAR HAUPT.